United States Patent
Agrawal et al.

(10) Patent No.: US 8,638,080 B2
(45) Date of Patent: Jan. 28, 2014

(54) CIRCUITS AND METHODS FOR CONTROLLING PWM INPUT OF DRIVER CIRCUIT

(75) Inventors: Jitendra Kumar Agrawal, Bangalore (IN); Biranchinath Sahu, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 69 days.

(21) Appl. No.: 13/232,720

(22) Filed: Sep. 14, 2011

(65) Prior Publication Data
US 2013/0063114 A1    Mar. 14, 2013

(51) Int. Cl.
*G05F 1/44* (2006.01)

(52) U.S. Cl.
USPC .......................................... 323/283; 323/284

(58) Field of Classification Search
USPC .................. 323/282–285, 299, 351
See application file for complete search history.

(56) References Cited

U.S. PATENT DOCUMENTS

| | | | | |
|---|---|---|---|---|
| 7,812,647 | B2* | 10/2010 | Williams | 327/110 |
| 7,876,080 | B2* | 1/2011 | Dwarakanath et al. | 323/284 |
| 7,928,774 | B2* | 4/2011 | Zannoth et al. | 327/108 |
| 7,994,827 | B2* | 8/2011 | Williams | 327/110 |
| 8,008,902 | B2* | 8/2011 | Melanson et al. | 323/285 |
| 8,233,256 | B2* | 7/2012 | Mehas et al. | 361/93.2 |
| 2011/0267142 | A1* | 11/2011 | Wismar | 330/129 |
| 2012/0038340 | A1* | 2/2012 | Shi et al. | 323/284 |
| 2012/0200271 | A1* | 8/2012 | Henzler | 323/235 |
| 2012/0257312 | A1* | 10/2012 | Mehas et al. | 361/18 |
| 2013/0043852 | A1* | 2/2013 | Marsili et al. | 323/283 |

* cited by examiner

*Primary Examiner* — Adolf Berhane
(74) *Attorney, Agent, or Firm* — William B. Kempler; Wade J. Brady, III; Frederick J. Telecky, Jr.

(57) ABSTRACT

Circuits and methods for controlling Pulse Width Modulation (PWM) input of a driver circuit during transition of states are provided. The driver circuit is operative in one of a high state, a low state and a tri-state based on the PWM input. The method includes receiving a tri-state command for transition from the high state to the tri-state. A PWM output signal is enabled to transition from a high logic value to a low logic value for driving the driver circuit from the high state to the low state upon receipt of the tri-state command. The PWM output signal is enabled to transition from the low logic value to a tri-state logic value for driving the driver circuit from the low state to the tri-state upon elapse of a threshold time delay. The PWM input to the driver circuit is based on the PWM output signal.

19 Claims, 5 Drawing Sheets

CIRCUITS AND METHODS FOR CONTROLLING PWM INPUT OF DRIVER CIRCUIT

TECHNICAL FIELD

The present disclosure generally relates to control of PWM input of a driver circuit in converters, for example a DC-DC converter.

BACKGROUND

In accordance with an example scenario, due to a rise in high-power applications, the demand for power supply systems capable of supplying high-power has increased. As a solution, various high-power applications, such as direct current (DC)-DC converters using switching power supplies, which occupy a relatively small amount of space, may be implemented. The switching power supplies utilize power metal-oxide-semiconductor field-effect transistors (MOSFETs) to handle high currents required by the high-power applications. The power MOSFETs are significantly larger than example MOSFETs and are driven by drivers that drive a large gate-to-source capacitance of the power MOSFETs.

The multi-phase power supply converter for high-current processors often use a combination of internal and external drivers for flexibility of board layout, for example, in mobile applications. For high-density applications with driver MOSFET (also known as DrMOS) devices, driverless controllers are commonly used. These drivers communicate with the multiphase power supply converter using a pulse width modulation (PWM) input.

SUMMARY

Circuits and methods for controlling Pulse width Modulation (PWM) input of driver circuit in a DC-DC converter are disclosed. In an embodiment, a PWM input controller circuit for controlling PWM input of the driver circuit during transition of states comprises a delay circuit, a holding circuit, and a buffer circuit. The delay circuit is configured to detect a falling edge of a PWM internal signal received from a PWM signal generator. The falling edge of the PWM internal signal is in response to a tri-state command for driving the driver circuit from the high state to the tri-state. The delay circuit is further configured to output a control signal in response to the falling edge of the PWM internal signal after a threshold delay of the falling edge of the PWM internal signal. The holding circuit is coupled with the delay circuit and is configured to provide a PWM float signal at an output from the holding circuit upon receipt of an asserted control signal. The PWM float signal is associated with the tri-state command. The buffer circuit is coupled with the holding circuit, and is configured to generate an output PWM signal in response to the PWM float signal received from the holding circuit and the PWM internal signal. The output PWM signal attains a low logic value from a high logic value when the PWM internal signal transitions from the high logic value to the low logic value in response to the tri-state command, and the output PWM signal attains a tri-state logic value from the low logic value when the PWM float signal is received from the output from the holding circuit, and wherein the PWM input to the driver circuit is based on the output PWM signal.

In another embodiment, a DC-DC converter circuit is provided. The DC-DC converter circuit comprises a high-side switch, a low-side switch, a driver circuit and a PWM input controller circuit. The high-side switch is operative in a first voltage range of a PWM input and the low-side switch is operative in a second voltage range of the PWM input. The high-side switch and the low-side switch are configured to transition to a tri-state in a third voltage range. The driver circuit comprises a high-side driver for operating the high-side switch, and a low-side driver for operating the low-side switch based on a level of the PWM input. The driver circuit is operative in one of a high state, a low state and a tri-state based on the level of the PWM input. The PWM input controller circuit is coupled with the driver circuit and configured to control PWM input of the driver circuit during transition of states. The PWM input controller circuit comprises a delay circuit, a holding circuit, and a buffer circuit. The delay circuit is configured to detect a falling edge of a PWM internal signal received from a PWM signal generator. The falling edge of the PWM internal signal is in response to a tri-state command for driving the driver circuit from the high state to the tri-state. The delay circuit is further configured to output a control signal in response to the falling edge of the PWM internal signal after a threshold time delay of the falling edge of the PWM internal signal. The holding circuit is coupled with the delay circuit and is configured to provide a PWM float signal at an output from the holding circuit upon receipt of an asserted control signal. The PWM float signal is associated with the tri-state command. The buffer circuit is coupled with the holding circuit, and is configured to generate an output PWM signal in response to the PWM float signal received from the holding circuit and the PWM internal signal. The output PWM signal transitions to a low logic value from a high logic value when the PWM internal signal transitions from the high logic value to the low logic value in response to the tri-state command. Also, the output PWM signal transitioning to a tri-state logic value from the low logic value when the PWM float signal is received from the output of the holding circuit. The PWM input received by the driver circuit is based on the output PWM signal.

In yet another embodiment, a method of controlling PWM input of a driver circuit is disclosed. The driver circuit is operative in one of a high state, a low state and a tri-state based on the PWM input. The method includes receiving a tri-state command for transition from the high state to the tri-state. Upon receipt of the tri-state command, a PWM output signal is enabled to transition from a high logic value to a low logic value for driving the driver circuit from the high state to the low state. The method further includes enabling the PWM output signal to transition from the low logic value to the tri-state logic value for driving the driver circuit from the low state to the tri-state upon elapse of a threshold time delay. The PWM input to the driver circuit is based on the PWM output signal.

DETAILED DESCRIPTION

In accordance with an example scenario, a number of DC-DC converters are implemented, wherein the DC-DC converters are electronic devices used for changing DC electrical power efficiently from one voltage level to another. Input for the DC-DC converter is derived from an alternating current (AC)-DC adaptor. Based on the application requirement, the input for the DC-DC converter can go up to 25V while output needs to be maintained at voltages close to 1V. For example, a DC-DC converter may be utilized for converting a 24V DC from an automobile battery to a 12V DC so as to operate a vehicle music system. In another example, a 5V DC on a personal computer motherboard may be stepped down to 3V, such as for use on a central processing unit (CPU) chip. In an embodiment, the input to the DC-DC converter is a PWM input. During a low duty cycle operation of the DC-DC converter, a small increase in the PWM input pulse width can cause large increase in inductor current. An example of a DC-DC converter is described in FIG. 1.

Figure 1:
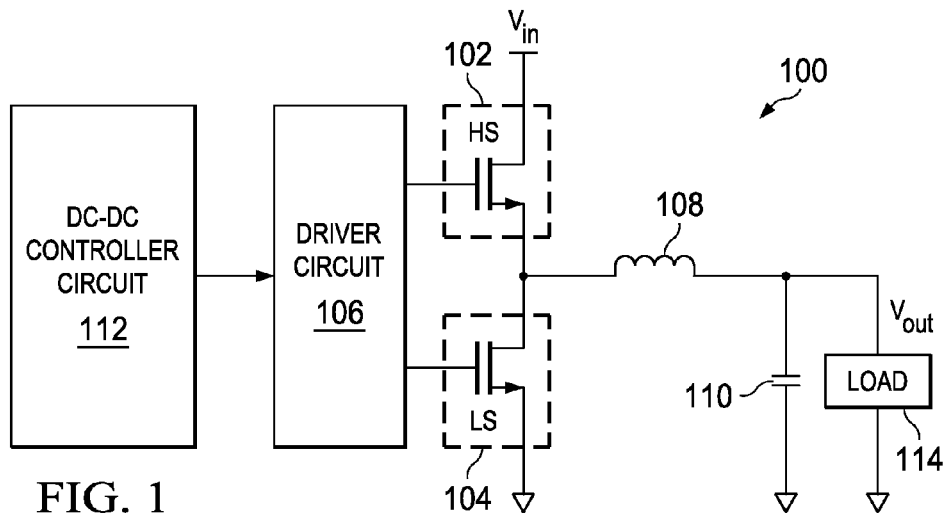
FIG. 1 illustrates a circuit for a DC-DC converter in an example embodiment.

FIG. 1 illustrates a DC-DC converter 100 according to an example embodiment. The converter 100 includes a high-side switch (for example, a MOSFET 102), a low-side switch (for example, a MOSFET 104), a driver circuit 106 that drives the MOSFET 102 and the MOSFET 104, an inductor 108, an output capacitor 110, and a DC-DC controller circuit 112. In an embodiment, the driver circuit 106 is a semiconductor chip, and the MOSFETs 102, 104, are configured on a separate semiconductor chip. The semiconductor chip comprising the driver circuit 106 includes or constitutes a driver integrated circuit (IC) of the DC-DC converter 100. Also, a source terminal of the low-side MOSFET 104 is coupled with or connected to a voltage reference point (e.g., a ground plane).

The PWM controller circuit 112 monitors an output voltage of the DC-DC converter 100 and maintains it at a preselected level by switching on and off the high-side MOSFET 102 and the low-side MOSFET 104. The driver circuit 106 receives a control voltage 114 as a PWM input from the DC-DC controller circuit 112, and based on a level of the control voltage, the driver circuit 106 operates in one of a high state, a low state and a tri-state. A high state (or logic high) refers to a state whereby the high-side driver is turned on and the low-side driver is turned off. For example, the state when the high-side MOSFET 102 is turned on and the low-side MOSFET 104 is turned off is referred to as a high state or logic high. In the high state, the current begins flowing from the source of the PWM input through the high-side MOSFET 102 and the inductor 108, and then into the output capacitor 110. The magnetic field in the inductor 108 therefore builds up, thereby storing energy in the inductor 108, with the voltage drop across the inductor 108 opposing or a buck part of the input PWM.

A low state or logic low of the input PWM refers to the state when the low-side driver is turned on but the high-side driver is turned off. When the high-side MOSFET 102 is turned off, the inductor opposes any drop in current by suddenly reversing its electromotive force (EMF), and now itself supplies current to the load 114. When the low-side MOSFET 104 is turned on and the high-side MOSFET 102 is turned off, current begins flowing from the inductor 108 to the low-side MOSFET 104, and then to the ground. The DC output voltage $V_{out}$, which appears across the load 114, is a fraction of the input voltage $V_{in}$. When the control voltage is in the intermediate voltage levels of the high state and the low state, also known as the tri-state condition, this represents that both the low-side driver and the high-side driver are turned OFF. The tri-state is an output whereby both of the active devices, for example, the MOSFET 102 and the MOSFET 104, can be caused to be in the off state at the same time, thus presenting a high-impedance state at the output (which may be similar to the off state of an open-circuit output).

A number of example applications may make use of the tri-state condition. For example, during a dynamic phase add/drop and other fault conditions in high-density applications (e.g., with DrMOS devices), an interface of the driver circuit 106 with the DC-DC controller circuit 112 is crucial for turning-on and turning-off conditions. For instance, in order to support light-load efficiency and skip-mode operation of the DC-DC converter, the high-side driver and the low-side driver can be turned-off (or caused to assume or transition to a tri-state condition) by the DC-DC PWM controller circuit 112.

When a PWM float signal is enabled from the PWM controller circuit side, an internal resistor divider (not shown) in the driver IC fixes or maintains a voltage level of the output PWM signal (or voltage level at the PWM pin in the DC-DC converter circuit) within the voltage level associated with the tri-state. Typically, during an inactive state (for example, a sleep mode) when the PWM interface circuit is not actively driven by the controller, the control voltage may be set by the driver circuit. Particularly, the driver circuit may include a pull-up resistance electronically coupled with or connected to power supply and a pull-down resistance electronically coupled with or connected to a ground plane, which may determine the value of the control voltage in the tri-state condition.

In an embodiment, the processors/controllers support a plurality of power operating states, such as a high state, a low state, and the tri-state. A transitioning from a high state to the tri-state condition depends on the time constant (which may be associated with an effective resistance and a capacitive load) in the pin/interface. For a low-duty cycle DC-DC converter, the delay can be quite large when compared to the actual on-time for a given duty-cycle. The internal resistor divider forces a PWM input to the tri-state voltage within a delay time ($T_{delay}$), depending on the parasitic capacitance and impedance at the PWM input. The delay time $T_{delay}$ is illustrated and explained with reference to FIG. 2. Additionally, the functioning of the DC-DC converter 100 of FIG. 1 is explained with reference to the timing diagrams of FIG. 2. It is noted, however, that the present technology is not limited to the example time relationships between the various waveforms shown in FIG. 2.

Figure 2:
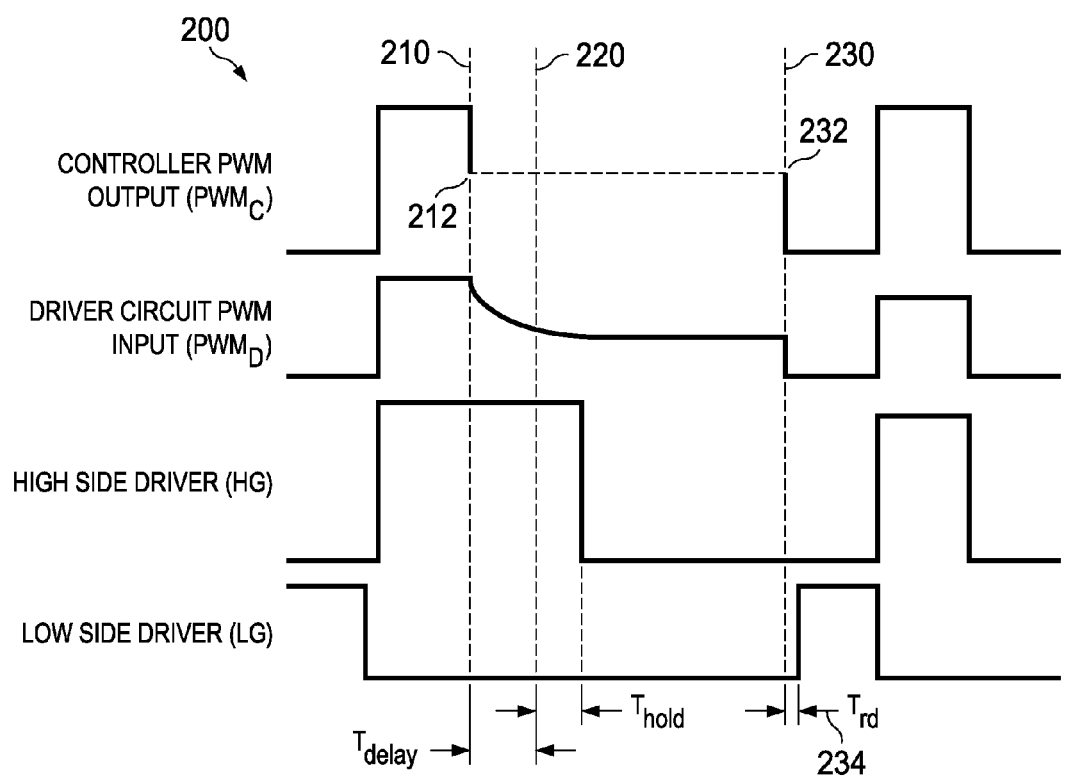
FIG. 2 is a timing diagram illustrating signals at various nodes of the DC-DC converter of FIG. 1 in an example embodiment.

FIG. 2 is a timing diagram illustrating signals at various nodes of the DC-DC converter 100 of FIG. 1 in an example embodiment during a transition from the high state to the tri-state. As depicted in the timing diagram 200 of FIG. 2, the variation of signals, namely a controller PWM output ($PWM_C$) signal, a driver circuit input (PWM) signal, a high-side driver output (HG) signal and a low-side driver output (LG) signal are depicted at various instants of time.

At instant 210, at a falling edge of the controller PWM output signal, the DC-DC controller circuit 112 commands the driver circuit 106 to transition from the high state to the tri-state. In an embodiment, the transition from the high state to the tri-state may be performed by enabling a PWM float signal. The enabling of the PWM float signal at instant 210 is marked at 212 in FIG. 2. When the PWM float signal is enabled, an internal resistor divider associated with the driver circuit forces the driver circuit output to assume a voltage level associated with the tri-state within a time delay period (represented as $T_{delay}$ between instants 210 and 220 in FIG. 2). As discussed, the time delay period $T_{delay}$ depends on the parasitic capacitance and impedance associated with the driver circuit 106 as seen by the DC-DC controller output PWM signal.

In an example scenario, the DC-DC controller output PWM signal may face an input impedance of about 15 kilohms and a parasitic capacitance of 10 picofarads (pF), which can cause a delay of about 600 nanoseconds (ns) (e.g., a 3-4 RC settling time) to assume, obtain or realize a voltage level associated with the tri-state. In addition, based on selected design parameters, a hold-off time (represented as $T_{hold}$ in FIG. 2) of about 150 ns may also be introduced, thereby causing the high-side switch (for example, the MOSFET 102) to turn on about 750 ns later than a time that is expected by the DC-DC controller circuit. For a 20V to 1V DC-DC converter operating at a 500 kilohertz (kHz) switching frequency, the steady-state on-time is 100 ns. Therefore, a 750 ns on-time can result in a large build-up of inductor current, which results in inductor saturation and other related failures in the DC-DC converter. As a result, when the DC-DC controller circuit 112 commands the driver circuit 106 to transition from a high-state to the tri-state condition, due to the settling delay (e.g., $T_{delay}$ and $T_{hold}$ combined), the high-side driver may remain turned-on for a longer period of time than is expected, thereby building a large inductor current, which may be unsuitable for smooth functioning of the DC-DC converter. The time for which the high-side driver is turned-on is represented collectively as $T_{delay}$ and $T_{hold}$ in the waveform for the high-side driver in FIG. 2.

At instant 214, when starting-up, the controller PWM output changes state from the low state to the tri-state by disabling the PWM float signal (which is marked as 232 in FIG. 2). In an embodiment, the driver circuit 106 may detect the disabling of the PWM float signal as a command for turning-on the low-side switch. As a result, the driver circuit 106 may switch on the low-side switch (for example, the MOSFET 104). The turning-on of the low-side switch is marked as 234 in the low-side (LS) driver signal in FIG. 2. As is shown, the low-side switch may be switched on with a recovery delay (which is represented as $T_{RD}$ in the signal waveform of the LS driver). The recovery delay $T_{RD}$ may build a negative inductor current and pull down pre-bias voltage at the output.

Based on the above discussion, the transition from the high state to the tri-state in the DC-DC converters may lead to a generation of a large inductor current, which might not be suitable for the smooth functioning of the controller. Moreover, transitioning from the low state to the tri-state may lead to turning-on of the low-side switch and may build a negative inductor current, which might not be suitable for the effective functioning of the controller. As such, it may be beneficial for the transition between the states of the driver circuit to be smooth and fast.

Various embodiments of the present technology provide solutions for transitioning between the states that may overcome the above and other limitations, in addition to providing currently unavailable benefits. For instance, various embodiments of the present technology provide a PWM input that incorporates a three-state logic to utilize a single pin interface between driver and controller IC. An embodiment of the present technology provides an interface between the controller and the driver circuit that may facilitate a transitioning from the high state to the tri-state by first transitioning from the high state to the low-side, and thereafter from the low state to the tri-state, thereby avoiding the turning on of the high-side driver for a longer duration, which may lead to a generation of a large inductor current. Various embodiments of the present technology provide circuits and methods configured to prevent a turning on of the low-side switch while transitioning from the low state to the tri-state, until a first PWM pulse is detected. This may be explained with reference to the circuit diagram of FIG. 3. Various embodiments of the present technology provide circuits and methods that can enable or be implemented during a transition between various states associated with the driver circuit. Various embodiments of the present technology are herein disclosed in conjunction with FIGS. 3 to 9.

Figure 3:
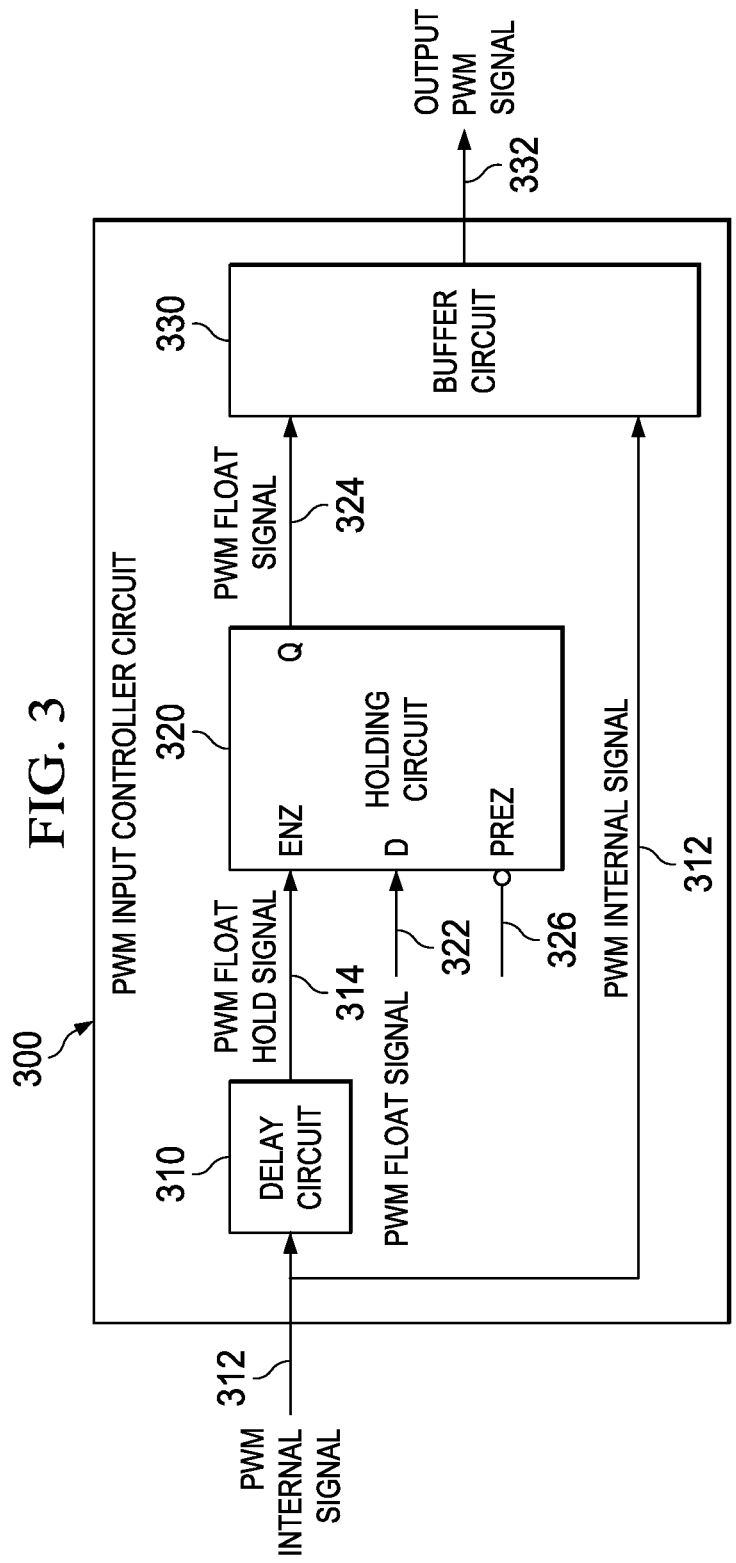
FIG. 3 illustrates a PWM input controller circuit configured to control a PWM input of a driver circuit in a DC-DC converter according to an embodiment.

FIG. 3 illustrates a PWM input controller circuit 300 configured to control the PWM input of a driver circuit, for example, the driver circuit 106 of FIG. 1 in a DC-DC converter, according to an embodiment. In an embodiment, the circuit 300 may be implemented as an external control interface between a DC-DC controller and an external driver circuit. In one embodiment, the circuit 300 may be implemented as an internal chip in the DC-DC controller. For example, the circuit may be integrated within the DC-DC controller circuit 112. As another example, the circuit 300 may be configured within the driver circuit, for example, the driver circuit 106.

The circuit 300 is configured to control a level of the PWM input to the driver circuit 106. The level of the PWM input of the driver circuit 106 may hereinafter be referred to as the PWM input voltage level. The circuit 300 provides a single pin interface between the DC-DC controller circuit 112 and the driver circuit 106 to control the PWM input voltage level. Accordingly, the PWM input voltage level may assume or obtain a value in one of the three voltage ranges to control the functionality of the driver circuit in one of the three modes. For example, when the PWM input voltage level of the driver circuit assumes or obtains a value in a first voltage range, the driver circuit 106 operates in a high state, thereby turning on the high-side switch and turning off the low-side switch. When the input voltage level to the driver circuit 106 assumes or obtains a value in a second voltage range, the driver circuit 106 operates in a low state, thereby turning on the low-side switch and turning off the high-side switch. When the input voltage level lies in a third or intermediate voltage range, the driver circuit may assume or enter a tri-state and turn on both the high-side and the low-side switches. The tri-state may also be referred to as a high-impedance state. In an embodiment, the values of the first voltage range, the second voltage range and the third voltage range may be as follows:

First/High state voltage range: Greater than 4V
Noise Margin
Tri-state voltage range: Lies between 1.5V to 2.5V
Noise Margin
Low voltage range: Less than 0.7V In an embodiment, the tri-state is associated with a PWM float signal. In an embodiment, a noise margin is provided between the first voltage range and the second voltage range, and another noise margin is provided between the second voltage range and the third voltage range, based on the design considerations.

In an embodiment, when the transitioning from the high state to the intermediate state is to be initiated, the high-side driver is turned ON, although the PWM float signal is held low. In an embodiment, the PWM float state is held low by enabling a control signal until the low-side driver is turned ON. In an embodiment, the control signal is a PWM float hold signal. In an embodiment, the control signal is enabled, thereby causing the PWM float signal to assume the low state until the low-side driver turns ON.

Once the low-side driver is turned ON, the PWM float signal is enabled based on certain operating conditions associated with the DC-DC converter. For example, The PWM float signal is associated with the tri-state of the driver circuit in the DC-DC converter. In an embodiment, the PWM float signal may be enabled when the load current steps down the transient such that the output voltage overshoot is reduced. In another embodiment, the PWN float signal may be enabled when an assumed "power save" state is changed, and a phase transition occurs based on processor load current parameters, which, pursuant to one example implementation, are preselected. In yet another embodiment, the PWM float signal may be enabled during a voltage regulator (VR) fault condition. In an embodiment, these signals are precluded from changing from the beginning of the ON time so as to turn ON the low-side driver. However, these signals may be changed after the low-side driver is completely turned ON. For example, these signals may be changed after a threshold time delay from the instant when the low-side driver is turned ON.

Referring again to FIG. 3, the circuit 300 includes a delay circuit 310, a holding circuit 320 and a buffer circuit 330. In an embodiment, the delay circuit 310 is configured to receive a PWM internal signal 312. In an embodiment, the PWM internal signal 312 may be generated by a signal generator associated with the DC-DC converter. The signal generator may generate the PWM internal signal based on one of a number of control methods that include, but which are not limited to an analog feedback controller, a digital controller, a microcontroller, and the like.

In an embodiment, the delay circuit 310 is configured to detect a falling edge of the PWM internal signal 312. The falling edge of the PWM internal signal 312 occurs in response to a tri-state command configured to enable a driving of the driver circuit 320 from the high state to the tri-state. The delay circuit 310 is further configured to output a control signal 314 in response to detecting the falling edge of the PWM internal signal 312 after a threshold delay of the falling edge of the PWM internal signal 312. In an embodiment, the control signal is a PWM float hold signal 314.

In an embodiment, a threshold delay time ($T_{threshold\ delay}$) of the control signal 314 may be determined based on a time constant of the delay circuit 310. In an embodiment, the delay circuit 310 is an asymmetrical edge delay circuit having a time constant that changes with a high/low state of the PWM internal signal.

In an embodiment, the delay cell 310 may be a single delay cell or a string of delay cells that may be represented by the block 310. Each delay cell has an input (In), an output (Out), and a reset input R. The delay cell 310 is configured to determine a time for which the PWM float signal is to be kept on hold, thereby maintaining the low-side driver in a switched-on state. In an embodiment, the PWM float signal 322 is to be held during a certain delay period after the low-side driver is switched on. This is done to ensure that the high-side driver is completely off and that the low-side driver is completely on. Particularly, this ensures that the low-side switch is not turned on until a first PWM input pulse is detected. Accordingly, the PWM input controller circuit 300 is designed in a manner such that whenever the control commands that the drivers enter a tri-state condition (for example, by initiating a tri-state command), it always transitions from the PWM low-state to the tri-state rather than from the high state to the tri state. As a result, the actual on-time of the high-side driver is based on the controller, and excessive current build-up in the inductor (for example, the inductor 108) is avoided. An example implementation of the delay cell 310 is explained in detail in FIG. 4.

The holding circuit 320 is coupled with or connected to the delay circuit 310. The holding circuit 320 is configured to provide a PWM float signal 324 at an output from the holding circuit upon the receipt of an asserted control signal 314. The PWM float signal is associated with the tri-state command.

Without limiting the scope of the present technology, in an example embodiment, the holding circuit comprises a D-latch, wherein a data terminal of the D-latch is configured to receive the PWM float signal. The latch operates with the control signal 314 as its input (see, e.g., PWM float hold 314). In an embodiment, the PWM float signal 322 is output from the holding circuit 320 in response to the falling edge of the PWM internal signal 312 after the elapse of the threshold delay time The holding circuit 320 holds/latches the active high PWM float signal at the output 324 of the holding circuit 320. As such, in the embodiment shown in FIG. 3, the PWM float signal, once captured by the holding circuit 320, is maintained unless the output of the holding circuit 320 is reset or cleared. In an example embodiment, a preset input 326 (see PREZ) of the holding circuit 320 may be utilized to clear the output of the holding circuit 320.

In some embodiments, the holding circuit 320 may include any device or set of devices capable of enabling a latching/holding of the PWM float signal (for instance, the active high signal) unless a clear or reset input is asserted. For instance, the holding circuit 320 may also be embodied as alone or in combination of a number of sequential and/or combinational elements, such as various types of flip-flops and/or latches, and logical gates such as AND gates, OR gates, NAND gates and NOR gates.

The PWM buffer circuit 330 is coupled with or connected to the holding circuit 320, and is configured to output an output PWM signal 332 in response to the PWM float signal output from the holding circuit 320. In an embodiment, the PWM buffer circuit 330 is configured to generate an output PWM signal 332 in response to the PWM float signal 324 received from the holding circuit 320 and the PWM internal signal 312. In an embodiment, the output PWM signal 332 is driven as the PWM input to the driver circuit.

In an embodiment, the output PWM signal transitions to a low logic value from a high logic value when the PWM internal signal 312 transitions from the high logic value to the low logic value in response to the tri-state command. In an embodiment, the output PWM signal 332 transitions to a tri-state logic value from the low logic value when the PWM float signal 312 is received from the output of the holding circuit 320.

Figure 4:
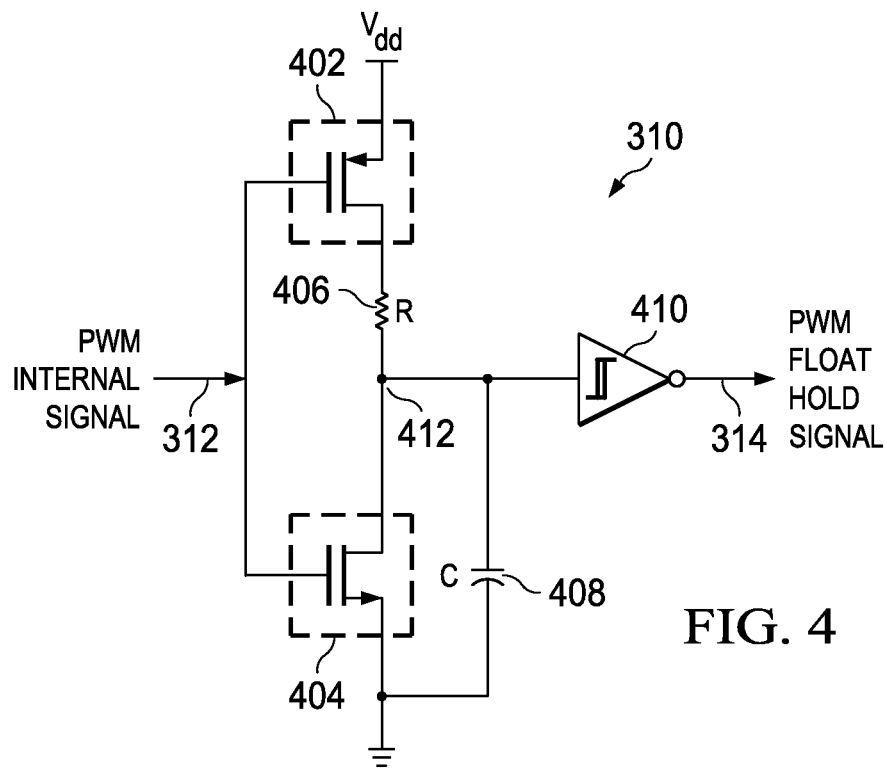
FIG. 4 illustrates a delay circuit associated with the PWM input controller circuit of FIG. 3 according to an embodiment.

FIG. 4 illustrates the delay circuit 310 associated with the PWM input controller circuit 300 of FIG. 3 according to an embodiment. In one embodiment, the delay circuit 310 may be realized by using a PMOS 402, an NMOS 404, a series resistor 406, a capacitor 408 and an inverter 410. In the delay circuit 400, the PMOS 402 and the NMOS 404 forms an inverter such that the gates of the PMOS 402 and the NMOS 404 form the inputs of the inverter. In an embodiment, the input of the delay circuit 310 is the PWM internal signal 312, and the output of the delay circuit is the PWM float hold signal 314 (as described in FIG. 3). In operation, as the input signal, for example, the PWM internal signal 312, transitions from a low voltage to a high voltage, the PMOS 402 and the NMOS 404 are turned on. As a result, the voltage at a node 412 drops from near $V_{dd}$ to near ground. Consequently, the charge across capacitor 408 is drained through the NMOS 404. The rate of discharge is determined by the size of the capacitor 408. During the negative cycle, when the input signal goes from the high voltage to the low voltage, the voltage at the output terminal (Out) is raised. Accordingly, the falling signal on the input of the delay circuit 310 is passed on to the output of the delay circuit 310, but this occurs after the delay created by the time constant of the capacitor 408. In an embodiment, the delay circuit is an asymmetrical edge delay circuit having a time constant that changes with a high/low state of the PWM internal signal 312.

Figure 5:
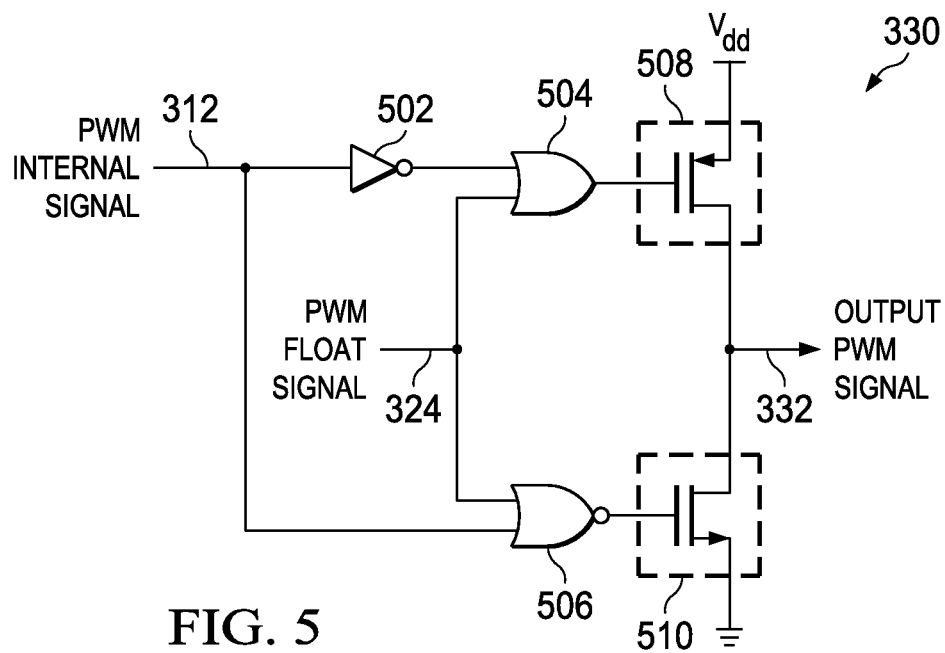
FIG. 5 illustrates a buffer circuit associated with the PWM input controller circuit of FIG. 3 according to an embodiment.

FIG. 5 illustrates the buffer circuit 330 associated with the circuit 300 of FIG. 3 according to an embodiment. The buffer circuit 330 is coupled with the holding circuit 320, and is configured to generate an output PWM signal (for example, the output PWM signal 332) in response to the PWM float signal (for example, the PWM float signal 324) received from the holding circuit 320 and the PWM internal signal 312. Without limiting the scope of the present technology, in an example embodiment, the buffer circuit 320 includes an OR gate 502, a NOR gate 506, a p-channel MOSFET 508 and an n-channel MOSFET 510. The OR gate 502 is configured to perform a logical "ORing" of an inverted output of the PWM internal signal 312 and the PWM float signal 314. The NOR gate is configured to perform a logical "NORing" of the PWM internal signal and the PWM float signal. An output of the OR gate 502 is coupled with or connected to an input of the gate of the p-channel MOSFET 508. Also, an output of the NOR gate 510 is coupled with or connected to the input of the gate of the n-channel MOSFET 510. Additionally, a drain of the p-channel MOSFET 508 is coupled with a drain of the n-channel MOSFET 510, and the output PWM signal 332 is derived from thereon. In an embodiment, when the PWM internal signal 312 and the PWM float signal 314 are at high logic value, and the PWM output signal is a signal associated with the tri-state of the driver circuit.

Figure 6:
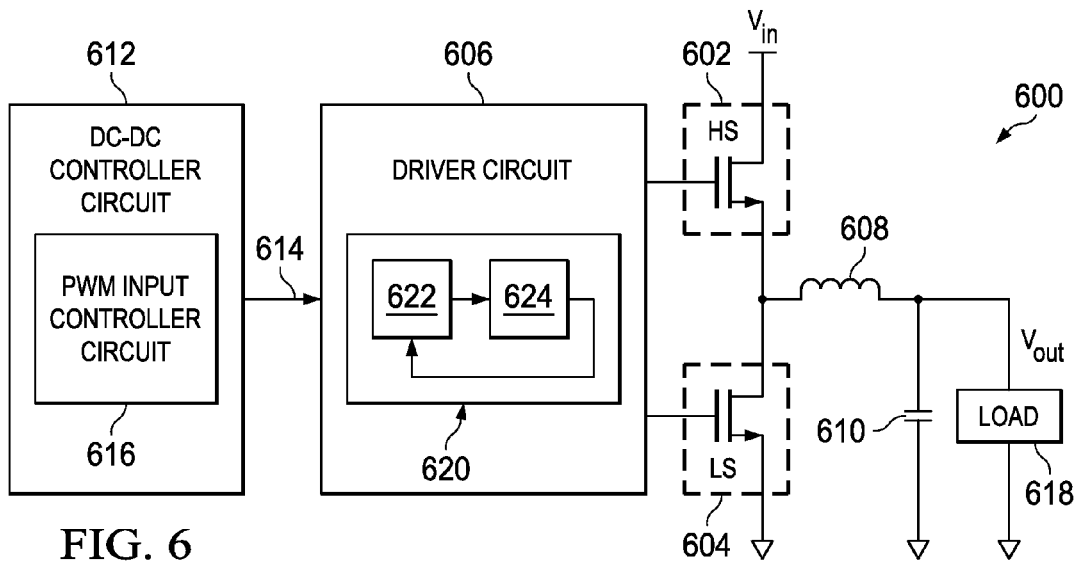
FIG. 6 illustrates a DC-DC controller circuit incorporating the PWM input controller circuit of FIG. 3 according to an embodiment.

FIG. 6 illustrates a DC-DC converter circuit 600 incorporating the PWM input controller 300 of FIG. 3 in accordance with an embodiment. The high-side switch (for example, a MOSFET 602), a low-side switch (for example, a MOSFET 604), a driver circuit 606 configured to drive the MOSFET 602 and the MOSFET 604, an inductor 608, an output capacitor 610, and a DC-DC controller circuit 612. It is noted that the elements of the DC-DC converter 600, for example, the MOSFET 602, the MOSFET 604, the inductor 608, and the output capacitor 610, are similar to the respective elements, for example, the MOSFET 102, the MOSFET 104, the inductor 108, and the output capacitor 110 of the DC-DC converter circuit 100, and, accordingly, a description thereof is omitted for the sake of brevity.

The DC-DC controller circuit 612 includes a PWM input controller circuit 616. The PWM circuit 616 is coupled with the driver circuit 606 and configured to control PWM input 614 of the driver circuit 606 during a transition of states, for example, a transition from the high state to the tri-state. The PWM input controller circuit 600 includes the delay circuit, a holding circuit, and a buffer circuit similar to the delay circuit 310, the holding circuit 320, and the buffer circuit 330, respectively, of FIG. 3. The description of the PWM input controller circuit 300 is already explained with reference to FIG. 3, and, accordingly, the description of respective elements of the PWM input controller 600 is omitted herein.

The driver circuit 606 is configured to receive the PWM input 614 from the PWM input controller 600 and operate a high-side driver and a low-side driver based on the level of the PWM input 614. The driver circuit 606 is operative in one of a high state, a low state and a tri-state based on the level of the PWM input 614. In one embodiment, the driver circuit 606 incorporates a resistor divider circuit 620 having a resistor divider assembly 622 and a control logic circuit 624 for controlling the operation of the resistor divider circuit 620. The resistor divider circuit is configured to optimize power consumption during the tri-state in the driver circuit 606. An example implementation of the resistor divider arrangement is explained in detail in FIG. 7.

Figure 7:
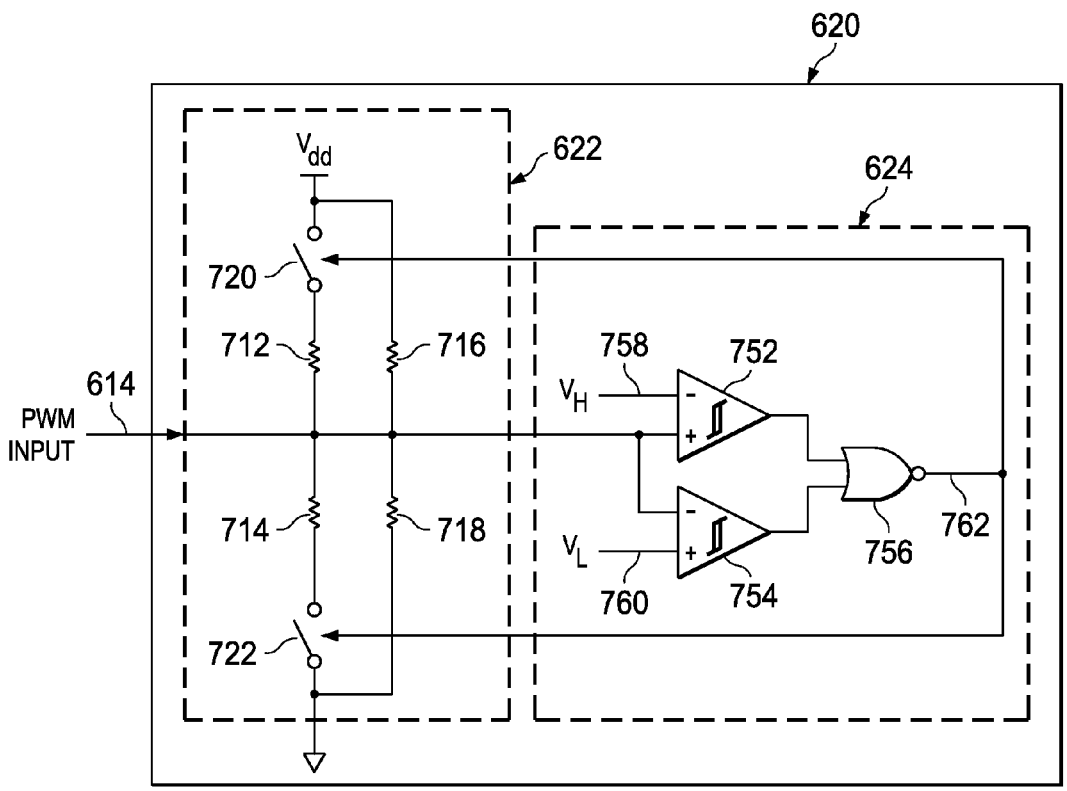
FIG. 7 illustrates a resistor divider arrangement associated with a driver circuit of the DC-DC controller circuit of FIG. 6 according to an embodiment.

FIG. 7 illustrates a resistor divider circuit 700 associated with the driver circuit 606 of FIG. 6 in accordance with an embodiment. The resistor divider circuit 700 includes a resistor divider assembly 710 and an associated logic configured for power optimization in the driver circuit 606 in accordance with an embodiment. The resistor divider assembly 710 includes a first resistor divider having low-impedance resistors and a second resistor divider having high-impedance resistors coupled or connected in parallel. For example, the first resistor divider having the low-impedance resistors may include low-impedance resistors, such as a resistors 712 and 714. Also, the second resistor divider having high-impedance resistors may include high-impedance resistors, such as resistors 716 and 718.

Additionally, the first resistor divider may include switches, for example, switches 720, 722, which are configured to control the switching on/off of the low-impedance resistor divider. In an embodiment, the switches 720, 722 may be operated based on a control logic. For example, when a tri-state condition is detected by the control logic, it turns OFF the high-side driver, the low-side driver and the first resistor divider to save standby current from the supply. The first resistor divider may be switched off by opening the switches 720, 722. During the tri-state condition, the voltage level associated with the tri-state is maintained by the high-impedance resistor divider having resistors 716, 718.

In an embodiment, the control logic is implemented by a control logic circuit, for example, the control logic circuit 624 coupled with or connected to the resistor divider circuit 622. The control logic circuit 624 includes a high-side buffer 752, a low-side buffer 754, and a logic gate, such as a NOR gate 756. The high-side buffer 752 is configured to receive the PWM input 614 at a non-inverting terminal thereof, and a high-side voltage ($V_H$) 758 at an inverting terminal thereof. The output of the high-side buffer is coupled with or connected to the input of the NOR gate 756. Also, the low-side buffer 754 is configured to receive the PWM input 614 at a inverting terminal thereof and a low-side voltage ($V_L$) 760 at a non-inverting terminal thereof. The output of the low-side buffer 754 is coupled with or connected to the input of the NOR gate 756.

During the tri-state, the outputs of the high-side buffer 752 and the low-side buffer 754 are active high. As such, the output of the NOR gate 768 is active high. Accordingly, when the tri-state is detected by the active high signal 768, the switches associated with the low-impedance resistors are consequently opened, thereby switching off the low-impedance resistor divider. Since the high-impedance resistor divider is switched on, the desired tri-state voltage level is maintained by the high-impedance resistor divider.

Figure 8:
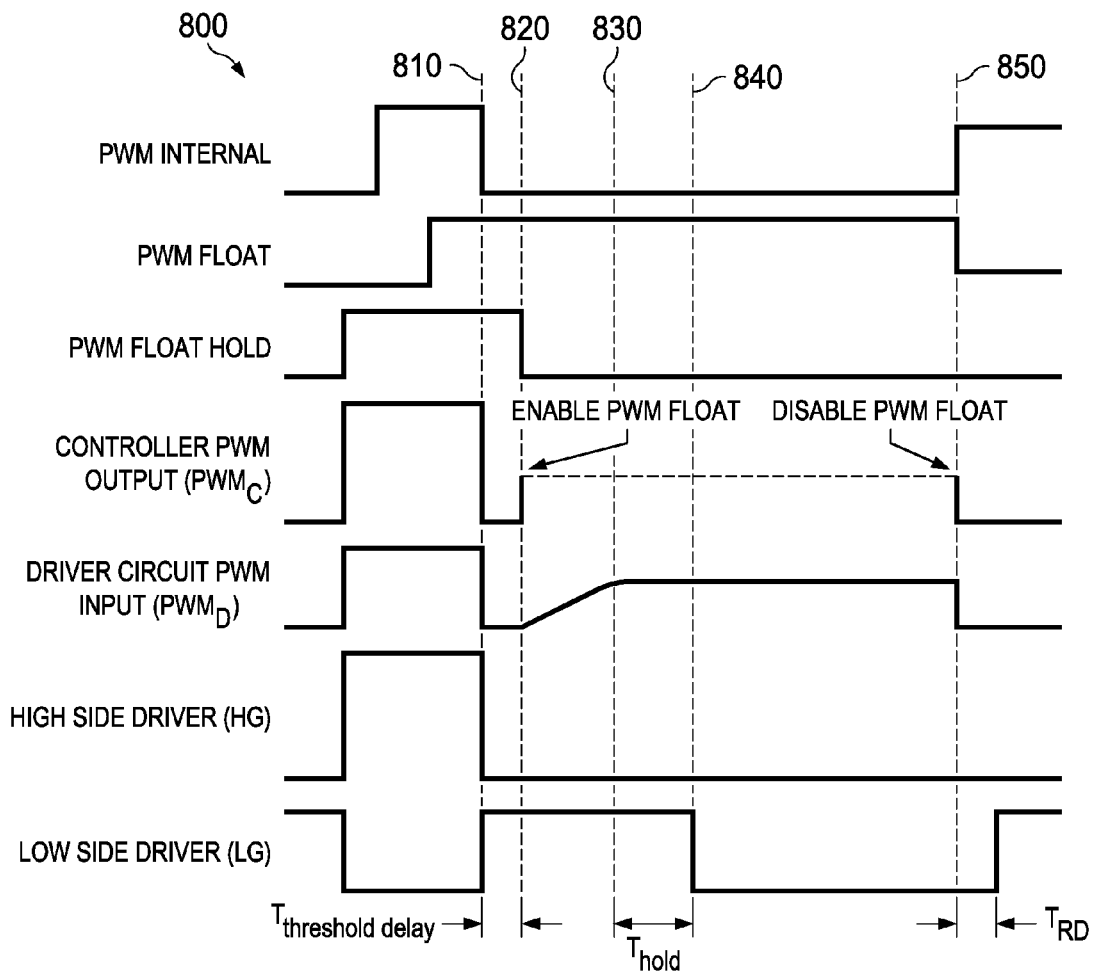
FIG. 8 is a timing diagram illustrating signals at various nodes of the DC-DC converter of FIG. 6 according to an embodiment.

Let us now consider the functioning of the DC-DC converter 600 incorporating the PWM input controller circuit 300 with reference to the timing diagrams of FIG. 8. It is noted, however, that the present technology is not limited to the example time relationships between the various waveforms shown in FIG. 8.

FIG. 8 is a timing diagram 800 depicting the details of signals at various nodes of the circuit 600 during the transitioning of the driver circuit between different states in accordance with an embodiment of present technology. As depicted in the timing diagram 800 of FIG. 8, the variation of signals, such as a PWM internal signal, a PWM float signal, a control signal or a PWM float hold signal, and a PWM controller output, are depicted over time. The PWM controller output signal is the combined output of a combination of the PWM internal signal and the PWM float signal. The PWM internal signal is generated by a signal generator. Various indicative transitions of signals at various nodes of the PWM input controller circuit 800 are herein explained at multiple instances.

At instant 810, which correspond to the falling edge of the PWM internal signal, the controller PWM output signal changes state from a high logic value to low logic value. At this instant, the PWM float hold signal is a high logic value. The PWM float hold signal remains at a high logic value for the threshold delay time ($T_{threshold\ delay}$), and, accordingly, during the threshold delay time, the controller PWM output signal is at a low logic value. In an embodiment, the threshold delay time is the time during which the high-side driver turns off (as illustrated in the high-side driver signal waveform) and the low-side driver turns on completely (as illustrated in the low-side driver signal waveform). In an embodiment, the low-side driver turns on completely when at least one PWM pulse is detected.

At instant 820, which occurs after the elapse of the threshold delay time, the PWM float signal attains a low logic value (or the PWM float hold signal is disabled). As illustrated in FIG. 8, at instant 820, the signal PWM float hold signal changes from a high logic value to a low logic value. Since, the PWM float signal is at a high logic value at the instant 820, the controller PWM output signal, which is the combination of the PWM internal signal and the PWM float signal, changes from the low logic value to the tri-state logic value. Accordingly, the PWM input of the driver circuit rises from the low logic value to the tri-state logic value between the instant 820 and the instant 830.

At instant 840, which occur after an elapse of a hold-off delay time period
($T_{hold}$), the low-side driver is turned off (as illustrated in the low-side driver signal waveform). In other words, the low-side driver signal changes from a high logic value to a low logic value, and the driver circuit assumes or transitions to the tri-state. At this instant, the high-side driver is also in the low state, and, accordingly, the driver circuit assumed or transitioned to the tri-state. The driver circuit is maintained in the tri-state logic until the PWM float signal is disabled at the instant 850.

At instant 850, when the PWM float signal is disabled, the PWM float changes state from a high logic value to a low logic value. The controller PWM output changes from a tri-state logic value to the low logic value. Accordingly, the driver circuit PWM input also changes from a tri-state logic value to a low logic value. The low-side driver changes state from a low logic value to high logic value (as illustrated in the low-side driver signal waveform). It is noted that the low-side driver changes from a low logic value to a high logic value during a recovery delay time period ($T_{RD}$).

Accordingly, various embodiments of the present technology provide circuits that can be used for controlling the PWM input of the driver circuit in a DC-DC controller. For instance, the circuit 300, and other variants of the circuit 300, may be utilized to control the input of the driver circuit during transition between different states, for example, from the high state to the tri-state.

Figure 9:
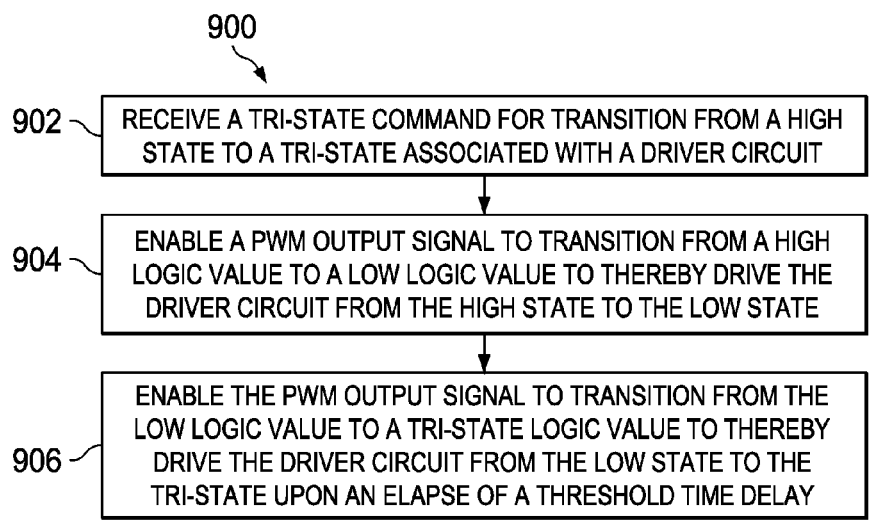
FIG. 9 is a flow diagram of a method of controlling a PWM input of a driver circuit in a DC-DC converter according to an embodiment.

FIG. 9 is a flow diagram of a method 900 for controlling the PWM input of the driver circuit in accordance with an embodiment. The method 900 includes enabling a PWM output signal to transition from a high logic value to a low logic value, and, after a threshold time delay, enabling the PWM output signal to transition from the low logic value to tri-state logic value. In certain embodiments, operations of method 900 may be performed by a PWM input controller circuit (see, e.g., FIG. 3).

At 902, the method 900 includes receiving a tri-state command to enable a transition from the high state value to the tri-state value. In an embodiment, the transition from the high logic value to the low logic value comprises a transition at a falling edge of a PWM internal signal. The PWM internal signal is generated by a signal generator. In an embodiment, the falling edge of the PWM internal signal occurs in response to the tri-state command configured to enable a driving of the driver circuit from the high state value to the tri-state value.

At 904, the method 900 includes enabling a PWM output signal to transition from a high logic value to a low logic value, so as to drive the driver circuit from the high state value to the low state value, upon receipt of the tri-state command (see, e.g., FIG. 3). In certain embodiments, enabling the PWM output signal to transition from the low logic value to the tri-state logic value comprises outputting a control signal in response to the falling edge of the PWM internal signal after the threshold time delay of the falling edge of the PWM internal signal. In an embodiment, the control signal is a PWM float hold signal. A PWM float signal is provided upon receipt of an asserted control signal. In an embodiment, the PWM float signal is associated with the tri-state command. The PWM output signal is generated upon receipt of the PWM float signal and the PWM internal signal. In an embodiment, the PWM float signal is received after the threshold time delay. In an embodiment, the threshold time delay is associated with a time period during which the transition of the PWM output signal from the high logic value to the low logic value is completely performed.

At 906, the method 900 includes enabling the PWM output signal to transition from the low logic value to the tri-state logic value so as to drive the driver circuit from the low state to the tri-state logic upon elapse of a threshold time delay. The PWM input of the driver circuit is based on the PWM output signal. Particularly, a level of the PWM input of the driver circuit in a first voltage range, a second voltage range and a third voltage range facilitates operation of the driver circuit in the high state, the low state and the tri-state, respectively.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these example embodiments, it is noted that certain modifications, variations, and alternative constructions are apparent and well within the spirit and scope of the technology.

Although various example embodiments of the present technology are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. A method of controlling Pulse Width Modulation (PWM) input of a driver circuit, the driver circuit operative in one of a high state, a low state and a tri-state based on the PWM input, the method comprising:
receiving a tri-state command to enable a transition from the high state to the tri-state;
enabling a PWM output signal to transition from a high logic value to a low logic value to thereby drive the driver circuit from the high state to the low state upon receipt of the tri-state command; and
enabling the PWM output signal to transition from the low logic value to a tri-state logic value to thereby drive the driver circuit from the low state to the tri-state upon an elapse of a threshold time delay, the PWM input signal to the driver being based on the PWM output signal, wherein the transition from the high logic value to the low logic value comprises transition at a falling edge of a PWM internal signal, the PWM internal signal being generated by a signal generator, wherein the falling edge of the PWM internal signal is in response to the tri-state command for driving the driver circuit from the high state to the tri-state command for driving the driver circuit from the high state to the tri-state.

2. The method of claim 1, wherein enabling the PWM output signal to transition from the low logic value to the tri-state logic value comprises: outputting a control signal in response to the falling edge of the PWM internal signal after the threshold time delay of the falling edge of the PWM internal signal; outputting a PWM float signal upon receipt of an asserted control signal, the PWM float signal being associated with the tri-state command; and generating the PWM output signal upon receipt of the PWM float signal
and the PWM internal signal, the PWM float signal being received after the threshold time delay.

3. The method of claim 1, wherein the threshold time delay is associated with a time during which the transition of the PWM output signal from the high logic value to the low logic value is substantially completely performed.

4. The method of claim 1, wherein a level of the PWM input of the driver circuit in a first voltage range, a second voltage range and a third voltage range facilitates operation of the driver circuit in the high state, the low state and the tri-state, respectively.

5. The method of claim 2, wherein the control signal is a PWM float hold signal.

6. A circuit for controlling Pulse Width Modulation (PWM) input of a driver circuit, the driver circuit operative in one of a high state, a low state and a tri-state based on the PWM input, the circuit comprising:
a delay circuit configured to detect a falling edge of a PWM internal signal received from a PWM signal generator, the falling edge of the PWM internal signal being in response to a tri-state command configured to enable a driving of the driver circuit from the high state to the tri-state, the delay circuit further configured to output a control signal in response to the falling edge of the PWM internal signal after a threshold delay time of the falling edge of the PWM internal signal;
a holding circuit coupled with the delay circuit and configured to provide a PWM float signal at an output of the holding circuit upon receipt of an asserted control signal, the PWM float signal being associated with the tri-state command; and
a buffer circuit coupled with the holding circuit and configured to generate an output PWM signal in response to the PWM float signal received from the holding circuit and the PWM internal signal, the output PWM signal transitioning to a low logic value from a high logic value when the PWM internal signal transitions from the high logic value to the low logic value in response to the tri-state command, the output PWM signal transitioning to a tri-state logic value from the low logic value when the PWM float signal is received from the output of the holding circuit, and the PWM input received by the driver circuit being based on the output PWM signal.

7. The circuit of claim 6, wherein the delay circuit comprises an asymmetrical edge delay circuit having a time constant that changes in accordance with the high state and the low state of the PWM internal signal.

8. The circuit of claim 6, wherein the threshold time delay is associated with a time during which the transition of the PWM output signal from the low logic value to the high logic value is substantially completely performed.

9. The circuit of claim 6, wherein the holding circuit comprises a D-latch, wherein a data terminal of the D-latch is configured to receive the PWM float signal.

10. The circuit of claim 6, wherein the control signal is a PWM float hold signal.

11. The circuit of claim 6, wherein the buffer circuit comprises:
an OR gate configured to perform logical ORing of an inverted output of the PWM internal signal and the PWM float signal;
a NOR gate configured to perform logical NORing of the PWM internal signal and the PWM float signal;
a p-channel MOSFET, an input to a gate of the p-channel MOSFET being coupled with or connected to an output of the OR gate; and
an n-channel MOSFET, an input to a gate of the n-channel MOSFET being coupled with or connected to an output of the NOR gate, wherein a drain of the p-channel MOSFET is coupled with a drain of the n-channel MOSFET and the output PWM signal is derived from thereon.

12. A DC-DC converter circuit configured for input signal control, the DC-DC converter circuit comprising:
a high-side switch operative in a first voltage range of a PWM input;
a low-side switch operative in a second voltage range of the PWM input, the high-side switch and the low-side switch configured to transition to a tri-state in a third voltage range;
a driver circuit coupled with the high-side switch and the low-side switch, the driver circuit comprising a high-side driver configured to operate the high-side switch and a low-side driver configured to operate the low-side switch based on a level of the PWM input, the driver circuit operative in one of a high state, a low state and a tri-state based on the level of the PWM input; and
a PWM input controller circuit coupled with the driver circuit and configured to control a PWM input of the driver circuit during a transition of states, the PWM input controller circuit comprising:

a delay circuit configured to detect a falling edge of a PWM internal signal received from a PWM signal generator, the falling edge of the PWM internal signal being in response to a tri-state command configured to enable a driving of the driver circuit from the high state to the tri-state, the delay circuit further configured to output a control signal in response to the falling edge of the PWM internal signal after a threshold time delay of the falling edge of the PWM internal signal;

a holding circuit coupled with the delay circuit and configured to provide a PWM float signal at an output of the holding circuit upon receipt of an asserted control signal, the PWM float signal being associated with the tri-state command; and a buffer circuit coupled with the holding circuit and configured to generate an output PWM signal in response to the PWM float signal received from the holding circuit and the PWM internal signal, the output PWM signal transitioning to a low logic value from a high logic value when the PWM internal signal transitions from the high logic value to the low logic value in response to the tri-state command, the output PWM signal transitioning to a tri-state logic value from the low logic value when the PWM float signal is received from the output of the holding circuit, and the PWM input received by the driver circuit being based on the output PWM signal.

13. The DC-DC converter circuit of claim 12, wherein the delay circuit comprises wherein the delay circuit comprises an asymmetrical edge delay circuit having a time constant that changes in accordance with a high state and the low state of the PWM internal signal.

14. The DC-DC converter circuit of claim 12, wherein the threshold time delay is associated with a time during which the transition of the PWM output signal from the low logic value to the high logic value is substantially completely performed.

15. The DC-DC converter circuit of claim 12, wherein the holding circuit comprises a D-latch, and wherein a data terminal of the D-latch is configured to receive the PWM float signal.

16. The DC-DC converter circuit of claim 12, wherein the control signal is a PWM float hold signal.

17. The DC-DC converter circuit of claim 12, wherein the buffer circuit comprises:

an OR gate configured to perform logical ORing of an inverted output of the PWM internal signal and the PWM float signal;

a NOR gate configured to perform logical NORing of the PWM internal signal and the PWM float signal;

a p-channel MOSFET, an input to a gate of the p-channel MOSFET being coupled with or connected to an output of the OR gate; and an n-channel MOSFET, an input to a gate of the n-channel MOSFET being coupled with or connected to an output of the NOR gate, wherein a drain of the p-channel MOSFET is coupled with a drain of the n-channel MOSFET and the output PWM signal is derived from thereon.

18. The DC-DC converter circuit of claim 12, wherein the driver circuit further comprises a low-impedance resistor divider and a high-impedance resistor divider, and wherein when the transition to the tri-state is determined, the high-side driver, the low-side driver and the low-impedance resistor divider circuit are turned off, and the high-impedance resistor divider is maintained in a turn on state for maintaining the PWM output signal in the third voltage range.

19. The DC-DC converter circuit of claim 12, wherein the threshold time delay is associated with a time during which the transition of the PWM output signal from the high logic value to the low logic value is substantially completely performed.

* * * * *